US011044780B2

(12) United States Patent
Landais et al.

(10) Patent No.: US 11,044,780 B2
(45) Date of Patent: Jun. 22, 2021

(54) SUPPORT OF MOBILE-TERMINATED DATA DELIVERY SERVICE TOWARDS A USER EQUIPMENT USING EXTENDED IDLE MODE DRX (71) Applicant: Alcatel Lucent, Nozay (FR)

(72) Inventors: Bruno Landais, Lannion (FR);
Laurent Thiebaut, Antony (FR);
Jean-Jacques Trottin, Nozay (FR);
Michael Dolan, Bolingbrook, IL (US);
Alessio Casati, Swindon (GB)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/061,072

(22) PCT Filed: Dec. 13, 2016

(86) PCT No.: PCT/EP2016/080829
§ 371 (c)(1),
(2) Date: Jun. 11, 2018

(87) PCT Pub. No.: WO2017/102748
PCT Pub. Date: Jun. 22, 2017

(65) Prior Publication Data
US 2018/0368202 A1 Dec. 20, 2018

(30) Foreign Application Priority Data
Dec. 15, 2015 (EP) ..................... 15307016

(51) Int. Cl.
*H04W 76/28* (2018.01)
*H04W 4/70* (2018.01)
(Continued)

(52) U.S. Cl.
CPC ............. *H04W 76/28* (2018.02); *H04W 4/70* (2018.02); *H04W 48/12* (2013.01);
(Continued)

(58) Field of Classification Search
CPC ........... H04L 12/1881; H04W 68/005; H04W 68/02; H04W 76/28; H04W 48/12; H04W 52/0216
See application file for complete search history.

(56) References Cited

U.S. PATENT DOCUMENTS 10,237,847 B2 * 3/2019 Jain ....................... H04W 68/04
370/311
2015/0043403 A1 2/2015 Martinez Tarradell et al.
(Continued)

FOREIGN PATENT DOCUMENTS

CN 102340876 A 2/2012
CN 102594705 A 7/2012

OTHER PUBLICATIONS

Alcatel-Lucent, Alcatel-Lucent Shanghai Bell, Nokia Networks, MT SMS procedures for UEs in extended idle mode DRX [online], 3GPP TSG-CT WG4#71 C4-152115, Internet <URL:http://www.3gpp.org/ftp/tsg_ct/WG4_protocollars_exCN4/TSGCT4_71_Anaheim/Docs/C4-152115.zip>, Nov. 20, 2015.
(Continued)

*Primary Examiner* — Shukri Taha
(74) *Attorney, Agent, or Firm* — Harness, Dickey & Pierce, P.L.C.

(57) ABSTRACT

A mobile network entity, such as Mobility Management Entity MME, is for the support of Mobile-Terminated MT Data Delivery via an interface such as the T6a interface between a Service Capability Exposure Function SCEF and the mobile network entity, towards a User Equipment UE using extended idle mode DRX served by the mobile network entity is configured to receive from the SCEF a MT Data Delivery Request including information indicating a time frame within which a MT Data Delivery Response is awaited by the SCEF.

19 Claims, 7 Drawing Sheets

(51) Int. Cl.
| | | |
|---|---|---|
| *H04W 48/12* | (2009.01) | |
| *H04W 52/02* | (2009.01) | |
| *H04W 76/18* | (2018.01) | |
| *H04W 68/00* | (2009.01) | |

(52) U.S. Cl.
CPC ...... *H04W 52/0216* (2013.01); *H04W 68/005* (2013.01); *H04W 76/18* (2018.02)

(56) References Cited

U.S. PATENT DOCUMENTS

| | | | |
|---|---|---|---|
| 2015/0327032 | A1 | 11/2015 | Hedman et al. |
| 2018/0206093 | A1* | 7/2018 | Jain .................. H04W 4/70 |
| 2018/0212710 | A1* | 7/2018 | Ronneke ............ H04W 28/02 |
| 2018/0324652 | A1* | 11/2018 | Ryu .................. H04W 8/04 |
| 2018/0332462 | A1* | 11/2018 | Kim .................. H04W 8/02 |

OTHER PUBLICATIONS

Neul, Asynchronous Message Transport for non-IP devices [online], 3GPP TSG-SA WG2#112 S2-164092, Internet, <URL:http://www.3gpp.org/ftp/tsg_sa/WG2_Arch/TSGS2_112_Anaheim/Docs/S2-154092.zip <https://protect-us.mimecast.com/s/9X2sC9rp1GUkVZ2mu1rlgy>>, Nov. 20, 2015.

Office action dated Apr. 23, 2019, issued in corresponding Japanese Patent Application No. 2018-531500.

"3rd Generation Partnership Project; Technical Specification Group Services and System Aspects; Architecture enhancements to facilitate communications with packet data networks and applications (Release 13)", 3GPP Standard; 3GPP TS 23.682, 3rd Generation Partnership Project (3GPP), Mobile Competence-Centre ;-650, Route Des Lucioles ; F-06921 Sophia-Antipolis Cedex ; France, vol. SA WG2, No. V13.3.0, Sep. 15, 2015 (Sep. 15, 2015), pp. 1-77, XP050996007*.

Alcatel-Lucent et al: "Introduction of non-IP data delivery via the SCEF for cellular IoT", vol. SA WG2, No. Riga; Jan. 25, 2016-Jan. 29, 2016, Jan. 19, 2016 (Jan. 19, 2016), XP051072344, Retrieved from the Internet <URL:http://www.3gpp.org/ftp/tsg_sa/WG2_Arch/TSGS2_113_St_Kitts/Docs/> [retrieved on Jan. 19, 2016]*.

Ericsson et al: "Introducing support for Non-IP data for CIoT", vol. SA WG2, No. Anaheim, US; Nov. 16, 2015-Nov. 20, 2015, Nov. 21, 2015 (Nov. 21, 2015), XP051014478, Retrieved from the Internet <URL:http://www.3gpp.org/ftp/Meetings_3GPP_SYNC/SA2/Docs/> [retrieved on Nov. 21, 2015]*.

Samsung et al: "Introduction of non-IP data delivery via the SCEF for cellular IoT", vol. SA WG2, No. Anaheim, CA USA; Nov. 16, 2015-Nov. 20, 2015, Nov. 23, 2015 (Nov. 23, 2015), XP051035884, Retrieved from the Internet <URL:http://www.3gpp.org/ftp/tsg_sa/WG2_Arch/TSGS2_112_Anaheim/Docs/> [retrieved on Nov. 23, 2015] *.

International Search Report (PCT/ISA/210) for international Application No. PCT/EP2016/080829.

Notification of Transmittal of the International Search Report and the Writen Opinion of the International Searching Authority, or the Declaration (PCT/ISA/220) for international Application No. PCT/EP2016/080829.

Written Opinion of the International Searching Authority (PCT/ISA/237) for international Application No. PCT/EP2016/080829.

Notification Concerning Submission, Obtention or Transmittal of Priority Document (PCT/IB/304) for international Application No. PCT/EP2016/080829.

Notification of the Recording of a Change (PCT/IB/306) for international Application No. PCT/EP2016/080829.

Indian Office Action dated Mar. 18, 2020, issued in corresponding Indian Patent Application No. 201847021780.

Chinese Office Action dated Nov. 4, 2020 issued in corresponding Chinese Appln. No. 201680078994.6.

* cited by examiner

SUPPORT OF MOBILE-TERMINATED DATA DELIVERY SERVICE TOWARDS A USER EQUIPMENT USING EXTENDED IDLE MODE DRX

CROSS-REFERENCE TO RELATED APPLICATIONS

This application is a national phase under 35 U.S.C. § 371 of PCT International Application No. PCT/EP2016/080829, which has an International filing date of Dec. 13, 2016, which further claims priority to European Application No. 15307016.4, filed Dec. 15, 2015.

The present invention generally relates to mobile communication networks and systems.

Descriptions of mobile communication networks and systems can be found in the literature, such as in particular in Technical Specifications published by standardization bodies such as for example 3GPP ($3^{rd}$ Generation Partnership Project).

An example of such systems is Evolved Packet System (EPS), specified in particular in 3GPP TS 23.401.

Enhancements are now introduced in systems such as EPS, to facilitate communications with applications such as Machine Type Communications (MTC) Applications. Such enhancements are specified in particular in 3GPP TS 23.682. Examples of such enhancements include functions for high latency communication, which may be used to handle Mobile Terminated (MT) communications with User Equipments (UEs) being unreachable while using power saving functions e.g. Extended Idle Mode DRX, as specified in particular in 3GPP TS 23.682 and 3GPP TS 23.401.

Further optimizations of systems such as EPS, for Cellular Internet of Things (CIoT), are currently under study. An example of such optimizations for CIoT is the support of Non-IP Data Delivery (NIDD), i.e. delivery of Data without use of the Internet Protocol (IP).

As recognized by the inventors, and as will be described with more detail later, there is a need to improve the support of Mobile-Terminated (MT) Data service towards a User Equipment UE using extended idle mode DRX.

There is a need to improve the support of Mobile-Terminated (MT) Data Delivery service, such as in particular Mobile-Terminated Non-IP Data Delivery (MT NIDD) via an interface such as T6a interface between a Service Capability Exposure Function SCEF and a mobile network entity such as Mobility Management Entity MME, towards a User Equipment UE using extended idle mode DRX served by said mobile network entity.

There is also a need to improve the support of Mobile-Terminated Short Message Service (MT-SMS) towards a User Equipment UE using extended idle mode DRX.

Embodiments of the present invention in particular address such needs.

These and other objects are achieved, in one aspect, by a mobile network entity such as Mobility Management Entity MME, configured to, for the support of Mobile-Terminated MT Data Delivery via an interface such as the T6a interface between a Service Capability Exposure Function SCEF and said mobile network entity, towards a User Equipment UE using extended idle mode DRX served by said mobile network entity:
- receive from the SCEF a MT Data Delivery Request including information indicating a time frame within which a MT Data Delivery Response is awaited by the SCEF.

These and other objects are achieved, in another aspect, by a Service Capability Exposure Function SCEF, configured to, for the support of Mobile-Terminated MT Data Delivery via an interface such as the T6a interface between said Service Capability Exposure Function SCEF and a mobile network entity such as Mobility Management Entity MME, towards a User Equipment UE using extended idle mode DRX served by said mobile network entity:
- send to said mobile network entity a MT Data Delivery Request including information indicating a time frame within which a MT Data Delivery Response is awaited by the SCEF.

These and other objects are achieved, in another aspect, by a mobile network entity such as Mobility Management Entity MME, configured to, for the support of Mobile-Terminated MT Data Delivery via an interface such as the T6a interface between a Service Capability Exposure Function SCEF and said mobile network entity, towards a User Equipment UE using extended idle mode DRX served by said mobile network entity:
- receive from the SCEF a MT Data Delivery Request including information of a maximum retransmission time for retransmission of the MT Data.

These and other objects are achieved, in another aspect, by a Service Capability Exposure Function SCEF, configured to, for the support of MT Data Delivery via an interface such as T6a interface between said Service Capability Exposure Function SCEF and a mobile network entity such as Mobility Management Entity MME, towards a User Equipment UE using extended idle mode DRX served by said mobile network entity:
- send to said mobile network entity a MT Data Delivery Request including information indicating a maximum retransmission time for retransmission of the MT Data.

These and other objects are achieved, in another aspect, by a mobile network entity such as Mobility Management Entity MME, configured to, for the support of Mobile-Terminated Data Delivery via an interface such as T6a interface between a Service Capability Exposure Function SCEF and said mobile network entity, towards a User Equipment UE using extended idle mode DRX served by said mobile network entity:
- once configured to monitor UE reachability after having rejected a MT Data Delivery Request from the SCEF, send to the SCEF, in a notification indicating that the UE is reachable again, information instructing to prioritize the retransmission of the MT Data towards this UE.

These and other objects are achieved, in another aspect, by a Service Capability Exposure Function SCEF, configured to, for the support of Mobile-Terminated Data Delivery via an interface such as T6a interface between said Service Capability Exposure Function SCEF and a mobile network entity such as Mobility Management Entity MME, towards a User Equipment UE using extended idle mode DRX served by said mobile network entity:
- receive from the mobile network entity, in a notification indicating that the UE is reachable again after unsuccessful delivery, information instructing to prioritize the retransmission of the MT Data towards this UE These and other objects are achieved, in another aspect, by a mobile Core Network entity such as Mobility Management Entity MME, configured to, for the support of Mobile-Terminated SMS, or for the support of Mobile Terminating Data Delivery via an interface such as T6a interface between a Service Capability Exposure Function SCEF and said mobile Core Network entity, towards a User Equipment UE using extended idle mode DRX served by said mobile Core Network entity:

send information to the Radio Access Network, to assist the Radio Access Network in determining a time during which a signalling connection with the UE should be maintained, based on a pending delivery of a Mobile-Terminated SMS or Mobile-Terminated Data to the UE.

These and other objects are achieved, in another aspect, by method for support of Mobile Terminated delivery service towards a User Equipment UE using extended idle mode DRX, said method including at least one step performed by at least one of the thus configured entities.

Some embodiments of apparatus and/or methods in accordance with embodiments of the present invention are now described, by way of example only, and with reference to the accompanying drawings, in which:

FIG. 5 illustrates an example of a MT NIDD procedure towards a UE using extended idle mode DRX, with MME requesting the retransmission of the Non-IP Data at a (later) Requested retransmission time, with the retransmission time requested by the MME being propagated to the SCS/AS.

FIG. 6 illustrates an example of a MT NIDD procedure towards a UE using extended idle mode DRX, with retransmission triggered by a subsequent Notification due to a Monitoring Request sent by the SCS/AS.

ABBREVIATIONS

AS Application Server
CIoT Cellular Internet of Things
DRX Discontinuous Reception
E-UTRAN Evolved Universal Terrestrial Radio Access Network
EPS Evolved Packet System
HSS Home Subscriber Server
ISD Insert Subscriber Data
MME Mobility Management Entity
MT Mobile Terminated
NIDD Non-IP Data Delivery
SCEF Service Capability Exposure Function
SCS Service Capability Server
SMS Short Message Service
UE User Equipment

DESCRIPTION OF VARIOUS ASPECTS AND/OR EMBODIMENTS OF THE INVENTION

As understood by the skilled person, various embodiments and/or aspects of the invention, described below for the case of Mobile-Terminated Non-IP Data Delivery, are not limited to such case and apply more generally to Mobile-Terminated Data Delivery.

As understood by the skilled person, various embodiments and/or aspects of the invention, described below for the case of a UE served by a Mobility Management Entity MME, i.e. for the case of a E-UTRAN (or 4G radio environment), are not limited to such case and could apply to other radio environments (such as 5G), where the UE is served by a mobile network entity other than MME.

3GPP SA2 is specifying a new "Non-IP Data Delivery" feature in 3GPP Rel-13 for UEs signalling support of CIoT (Cellular Internet of Things) EPS optimizations, whereby the Non-IP Data Delivery (NIDD) between the UE and a non-IP peer point (Application Server also known as SCS/AS) or non-IP Gateway Interworking Function can be accomplished using the T6a interface between the serving MME and an SCEF (Service Capability Exposure Function). See the stage 2 CRs [1] and [2] which have been technically endorsed at SA2 #112 (November 2015).

REFERENCES

[1] S2-154454: 23.401 CR2934: Introducing support for Non-IP data for CIoT
[2] S2-154400: 23.682 CR0154: Introduction of non-IP data delivery via the SCEF for cellular IoT.

In the solution currently under definition in 3GPP SA2, Non-IP Data Delivery fails if the serving MME is not able to deliver the data to the UE. This would result in (nearly systematic) failure of Non-IP Data Delivery initiated by the network towards UEs using power saving mechanisms such as extended idle mode DRX (as the UE is actually listening to the paging channels during a very small amount of time, e.g. possibly only during 10 s every 43 minutes).

With the current solution, the SCS/AS would need to subscribe to be notified when the UE becomes reachable prior to initiating any MT Non-IP Data Delivery to the UE, which would cause excessive signalling in the network and be less signalling efficient than MT SMS procedures towards UEs using a power saving mechanism such as extended idle mode DRX.

In addition, there is no synchronisation between the SCS/AS and the MME about the time period during which the MME maintains the signalling connection with the UE. So there is no guarantee that the SCS/AS will retransmit the Non-IP Data during the time window where the signalling connection is maintained (e.g. due to SCS/AS overload).

Figure 1:
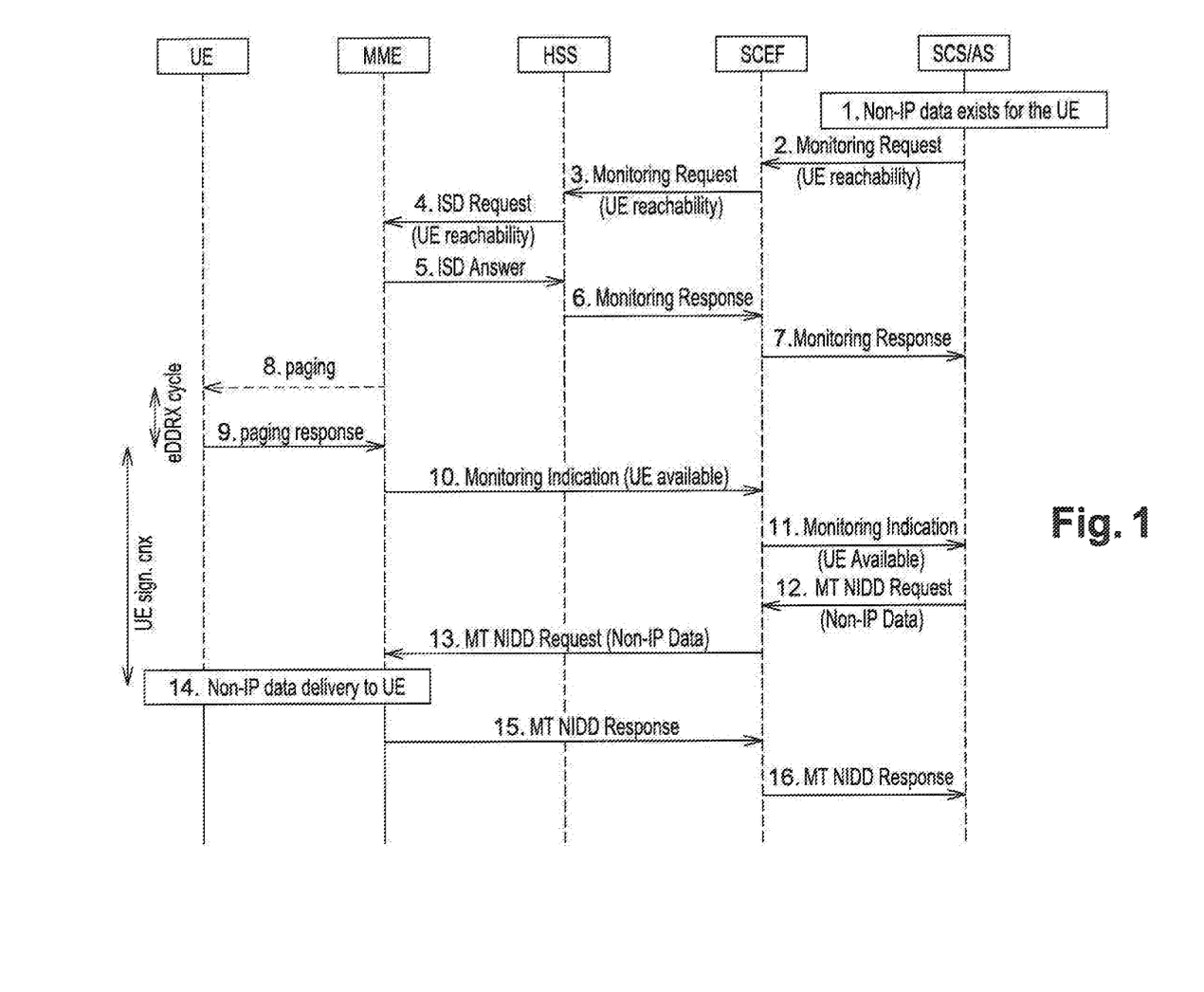
FIG. 1 is intended to illustrate issues with a MT NIDD (Non-IP Data Delivery) procedure towards a UE using extended idle mode DRX, as currently defined.

The MT NIDD procedure as being currently defined in [2] is depicted in FIG. 1:
1. The SCS/AS needs to send MT non-IP data to the UE.
2. Since the MT NIDD Request would be rejected if the MME was not able to deliver the MT non-IP data to the UE, the SCS/AS needs first to request to monitor when the UE is reachable.
3. The SCEF configures the monitoring event in the HSS, as specified in the Monitoring Feature specified in 3GPP Rel-13 (see 3GPP TS 23.682).
4. The HSS configures the monitoring event in the serving MME, as specified in the Monitoring Feature specified in 3GPP Rel-13 (see 3GPP TS 23.682).
5 to 7. The SCS/AS is notified via the HSS and SCEF that the monitoring request has been taken into account by the network.

8. The MME pages the UE at the next paging occurrence of the UE (taking into account the extended DRX cycle negotiated with the UE for a UE using extended idle mode DRX).
9. The UE responds to the paging request.
10. The MME notifies the SCEF that the UE is available. The MME also maintains the signalling connection with the UE to allow subsequent exchange of signalling or data to the UE.
11. The SCEF notifies the SCS/AS that the UE is available.
12. The SCS/AS initiates the transfer of the non-IP data to the UE.
13. The SCEF sends the non-IP data towards the serving MME.
14. The MME transfers the non-IP data to the UE.
15 to 16 The successful transfer of the non-IP data to the UE is reported to the SCS/AS.

NOTE: the reference [2] does not describe the steps 2 to 11, but without these steps, the MT NIDD Request (from step 12 onwards) would fail if the UE is using a power saving mechanism such as extended idle mode DRX and the UE is not expected to shortly respond to the paging request. Issues caused by the current procedure include:
  a. It would cause excessive signalling in the network, including signalling at the HSS for every network initiated NIDD towards the UE.
  b. There is no synchronisation between the SCS/AS and the MME about the time period during which the MME maintains the signalling connection with the UE. So there is no guarantee that the SCS/AS retransmits the non-IP data during the time window where the signalling connection is maintained (e.g. in case of SCS/AS overload).
  c. The MT NIDD procedure would be much less signalling efficient than existing procedures for MT SMS.

Thus, optimizations are required to support efficient MT Non-IP Data Delivery between the SCEF and the serving MME via an interface such as the T6a interface, towards UEs using a power saving mechanism such as extended idle mode DRX.

Embodiments and/or aspects of the invention in particular enable such support of efficient MT Non-IP Data Delivery.

Embodiments and/or aspects of the invention include different options.

In some aspects and/or embodiments of the invention, these different options may be summarized in the following way, from a MME perspective.

Upon receipt of a MT NIDD Request, the MME may:
  store the Non-IP Data and sends it to the UE without any Non-IP data retransmission (from the SCEF), if the UE is expected to be reachable shortly or within the time window during which the SCEF expects the MT NIDD Response; or
  return an MT NIDD Response with an Error and with an indication of the time at which the Non-IP data should be retransmitted to the MME, if the MT NIDD Request indicated that the Non-IP data can be retransmitted within a maximum retransmission time and if the UE is expected to be reachable within this time period. If so, the SCEF or the SCS/AS stores and retransmits the Non-IP data to the MME at the time requested in the MT NIDD Response; if the UE initiates Mobile Originated NAS signalling prior to the time at which the Non-IP data has been requested to be retransmitted, the MME may send a Notification to the SCEF to report that the UE is available and so to trigger the retransmission of the Non-IP data immediately; or
  return an MT NIDD Response with an Error in the other cases, e.g. if the UE is not expected to be reachable within the maximum retransmission time indicated by the SCEF. The SCEF or the SCS/AS may then initiate a Monitoring Request procedure to be notified when the UE becomes reachable, and may retransmit the Non-IP data at this time. When notifying the SCEF and SCS/AS that the UE is available, the MME also signals that the SCS/AS should prioritize the retransmission of the Non-IP data towards this UE, e.g. by signalling the time period during which it intends to maintain the signalling connection with the UE.

Embodiments and/or aspects of the invention include different options which will be referred to below as Option1, Option 2, Option 3. Examples of MT NIDD procedures related to these different options will be described in relation with FIGS. 2 to 7.

Option 1. This option may be summarized in the following way. The SCEF indicates in the MT NIDD Request the time window during which it waits for the MT NIDD Response, to let the serving MME know until when it can send the MT NIDD Response. This allows the MME to store the Non-IP Data and send it to the UE without any retransmission, if the UE is expected to respond to the paging request shortly or within the time frame indicated by the NIDD-Start-Time/Timer (e.g. within the next 30 s to 10 min).

NOTE: the Information Element(s) to signal the time until which an MT NIDD Response is awaited can take the form of a NIDD-Start-Time and NIDD-Start-Timer, or any other form.

Figure 2:
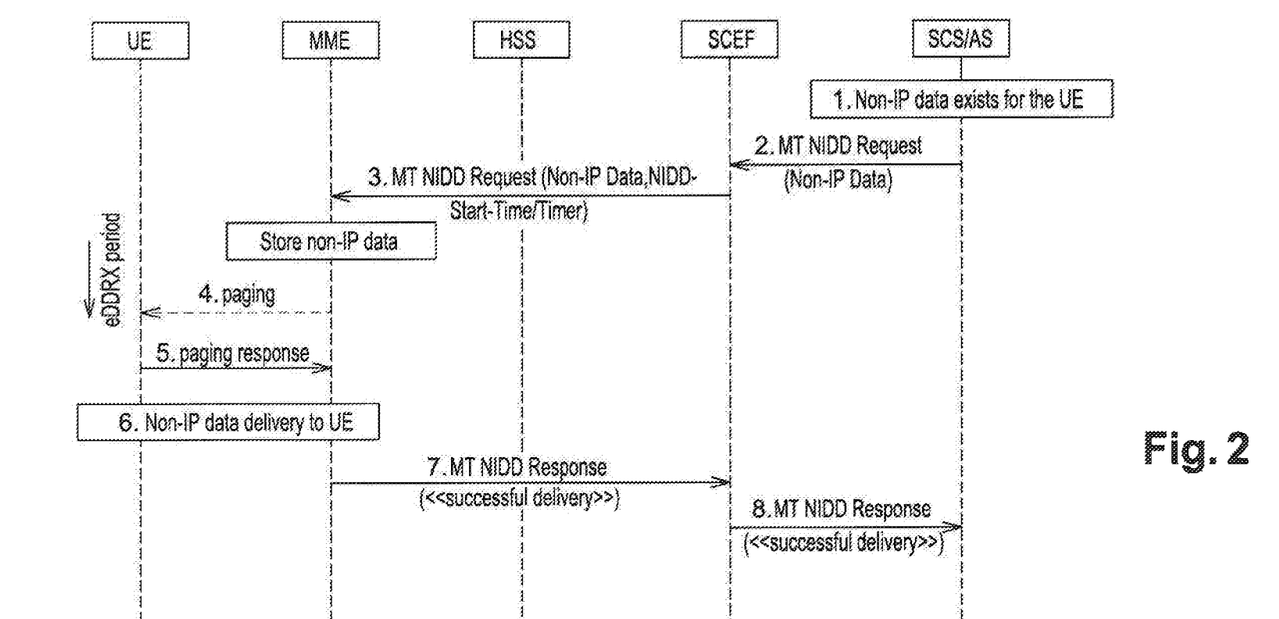
FIG. 2 illustrates an example of a MT NIDD procedure towards a UE using extended idle mode DRX, with MME storing the Non-IP Data if the UE is expected to respond to the paging request within the time window indicated by the SCEF.

FIG. 2 illustrates an example of such MT NIDD procedure with MME storing the Non-IP Data if the UE is expected to respond to the paging request shortly or within the time window indicated by the SCEF.

The example of MT NIDD procedure illustrated in FIG. 2 includes following steps:
  1. The SCS/AS needs to send MT non-IP data to the UE.
  2. The SCS/AS initiates the transfer of the non-IP data to the UE.
  3. The SCEF sends the MT NIDD Request (including the non-IP Data and the above-mentioned time frame indicated by the NIDD-Start-Time/Timer) towards the serving MME.
  4. The MME stores the non-IP data to the UE and pages the UE.
  5. The UE sends a paging response.
  6. The MME transfers the non-IP data to the UE.
  7 to 8. The successful transfer of the non-IP data to the UE is reported to the SCS/AS.

Option 2. This option may be summarized in the following way. The SCEF indicates in the MT NIDD Request a new Maximum Retransmission Time Information Element (IE) (e.g. 10 to 43 minutes) if it supports the option to store and retransmit the Non-IP data. If so, this IE also indicates for how long the SCEF is ready to store the non-IP data if it cannot be delivered at once.

If the UE is expected to respond within the Maximum Retransmission Time (but not soon enough to allow the mechanism in "Option 1" to be used), the MME rejects the MT NIDD Request with the indication of the time at which the Non-IP data should be resent to the MME. The MME does not set any MNRF (Mobile Not Reachable) like flag i.e. it will not send any subsequent notification to the HSS when the UE becomes available.

The SCEF stores and retransmits the Non-IP data to the MME at the time requested in the MT NIDD Response. The new MT NIDD Request should not include the Maximum Retransmission Time IE to fallback to the "Option 3" below if the UE is not reachable at the time that was indicated by the MME.

Figure 3:
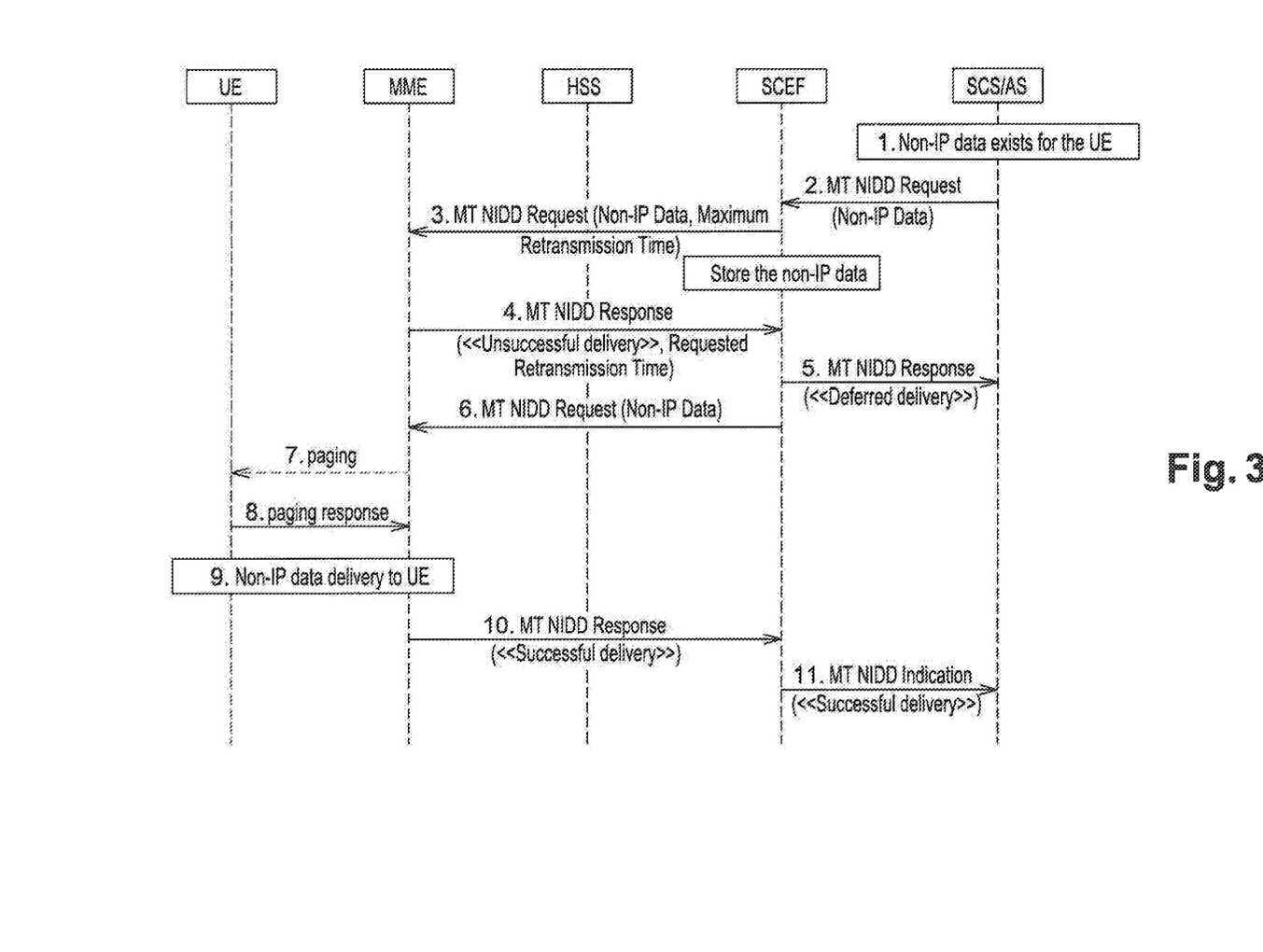
FIG. 3 illustrates an example of a MT NIDD procedure towards a UE using extended idle mode DRX, with MME requesting the retransmission of the Non-IP Data at a (later) Requested retransmission time.

FIG. 3 illustrates an example of such MT NIDD procedure with the MME requesting the retransmission of the Non-IP Data at a later time.

The example of MT NIDD procedure illustrated in FIG. 3 includes following steps:

1. The SCS/AS needs to send MT non-IP data for the UE.
2. The SCS/AS initiates the transfer of the non-IP data to the UE.
3. The SCEF sends the non-IP data towards the serving MME, with the indication of the time until which it can retransmit the Non-IP data.
4. The MME rejects the request and indicates the time at which it requests the Non-IP data to be retransmitted. The MME stores that a NIDD request is on-going for the SCEF.
5. The SCEF sends a MT NIDD Response to the SCS/AS to acknowledge that the request to send non-IP data to the UE has been taken into account by the network.
6. The SCEF retransmits the non-IP data at the time requested by the MME.
7 to 9. The MME delivers the Non-IP data to the UE.
10. The MME sends a successful response to the SCEF and clears any indication that a NIDD request is on-going for this SCEF.
11. The SCEF sends a new indication message to the SCS/AS to report the successful delivery of the Non-IP data.

If the UE initiates Mobile Originated signalling prior to the time at which the Non-IP data was requested to be retransmitted, the MME sends a notification message to the SCEF informing the latter about the availability of the UE; in that case, the SCEF retransmits the Non-IP data immediately.

Figure 4:
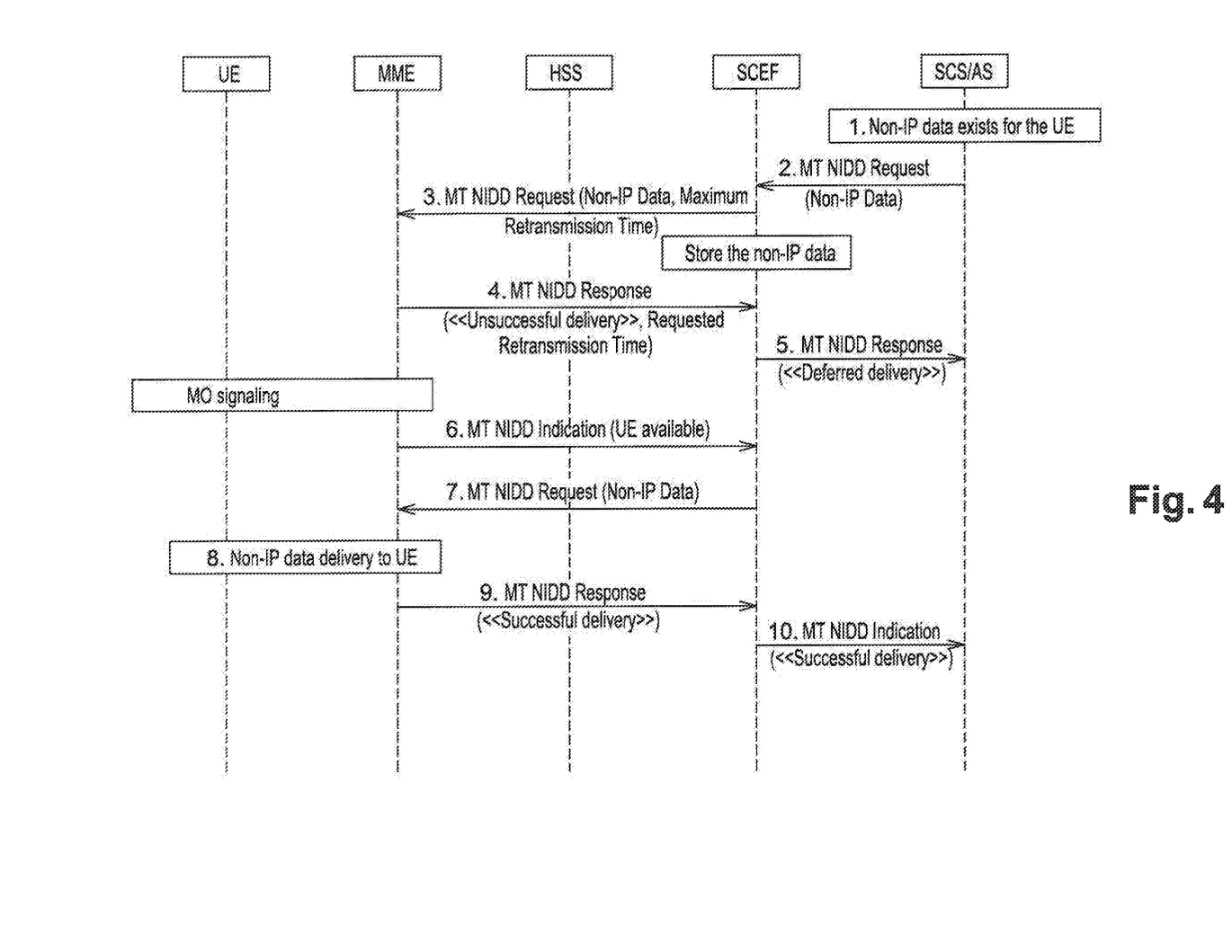
FIG. 4 illustrates an example of a MT NIDD procedure towards a UE using extended idle mode DRX, with MME requesting the retransmission of the Non-IP Data prior to the Requested retransmission time

FIG. 4 illustrates an example of such MT NIDD procedure with the MME requesting the retransmission of the Non-IP Data prior to the Requested retransmission time This corresponds to step 6 of FIG. 4 which is triggered by the reception of MO signaling from the UE while the MME had stored at step 4 (FIG. 2) that a NIDD request is on-going for the SCEF. Other steps of FIG. 4 may be as illustrated in FIG. 3.

Note: The message sent in step 6 may take the form of a new MT NIDD Indication message or can be the existing Monitoring Indication message. In step 6 the MME indicates that the UE is available and that it is still serving the UE (no need for SCEF to contact again the HSSS to get the identity of the MME).

Likewise, when the MME had stored at step 4 (FIG. 4) that a NIDD request is on-going for a SCEF, upon mobility to a new MME, the old MME can send a similar notification to the SCEF informing the latter that the UE has left to another serving node. The SCEF retrieves then the new serving MME address from the HSS and retransmit the Non-IP data to the new serving MME.

The new MME should keep the UE in CONNECTED state for a time long enough for the SCEF to have time to 1) receive the notification from the old MME, 2) make sure that the address of the new MME has been stored in the HSS 3) retrieve from the HSS the identity of the new MME, 4) Issue the new MTNIDD request to the new MME. The old MME may provide the new MME with an indication that there is a pending NIDD delivery for that UE, for that purpose.

The notifications sent to the SCEF allow the SCEF to discriminate the case of a spontaneous MO data from the UE and the case of a MME change. In the former case it should not fetch again the identity of the MME, while in the latter it has to fetch the identity of the MME from HSS, allowing furthermore the HSS to control whether MT data delivery is allowed in the new location of the UE.

As an alternative, the SCEF may propagate the retransmission time requested by the MME to the SCS/AS, in which case the retransmission is under the responsibility of the SCS/AS, i.e. the SCEF does not need to store the Non-IP data.

Figure 5:
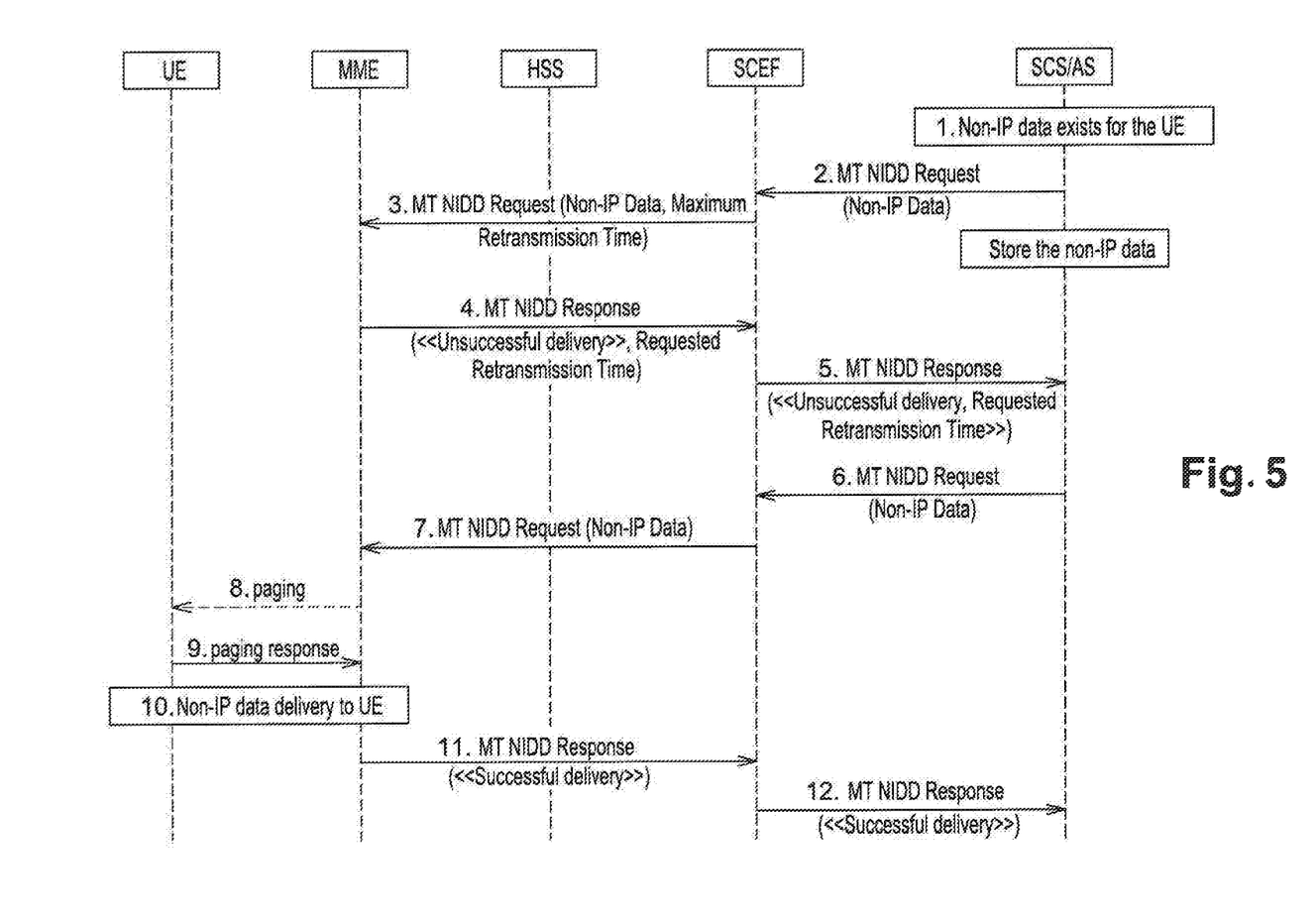

FIG. 5 illustrates an example of such MT NIDD procedure with the MME requesting the retransmission of the Non-IP Data at a later time, with the retransmission time requested by the MME being propagated to the SCS/AS.

Note: the Maximum Retransmission Time can possibly also be signalled by the SCS/AS at step 2 in FIG. 3, or 4, or 5.

Option 3. This option may be summarized in the following way. If none of the options above are possible, e.g. the UE is not expected to be reachable within the Maximum Retransmission Time, the MME rejects the MT NIDD Request without indicating any retransmission time.

The SCS/AS or the SCEF may initiate then a Monitoring Request to be notified when the UE becomes reachable.

When the UE becomes reachable, the MME sends a notification that the UE is available which includes an indication instructing the SCEF or SCS/AS to prioritize the retransmission of Non-IP data sent to this UE. The indication may take the form of e.g. a new Maximum-UE-Availability-Time IE which indicates the time window until when the network intends to maintain the signalling connection with the UE after the paging response (e.g. 30 seconds).

The MME should inform the eNodeB to maintain the signalling connection with the UE for a time that is sufficiently long to retransmit and deliver the Non-IP Data to the UE. In other words, a mobile Core Network entity such as MME should send information to a Radio Access Network entity such as eNodeB, to assist the Radio Access Network in determining a time during which a signalling connection with the UE should be maintained, based on a pending delivery of a Mobile-Terminated SMS or Mobile-Terminated Data to the UE.

The MME may do so e.g. by setting in S1AP signalling a longer Expected Activity Period value based on whether there is pending signalling to the UE (e.g. Non-IP Data), or by including a new information informing the eNodeB that there is pending network initiated signalling for that UE or providing the eNodeB with a recommended minimum user activity timer to be used for that UE.

It should be noted that these aspects related to informing the eNodeB (or more generally the RAN for the case of other radio environment than E-UTRAN) apply not only to MT Data Delivery (such as MT NIDD), but also to MT Short Message Service (SMS) Delivery.

Figure 6:
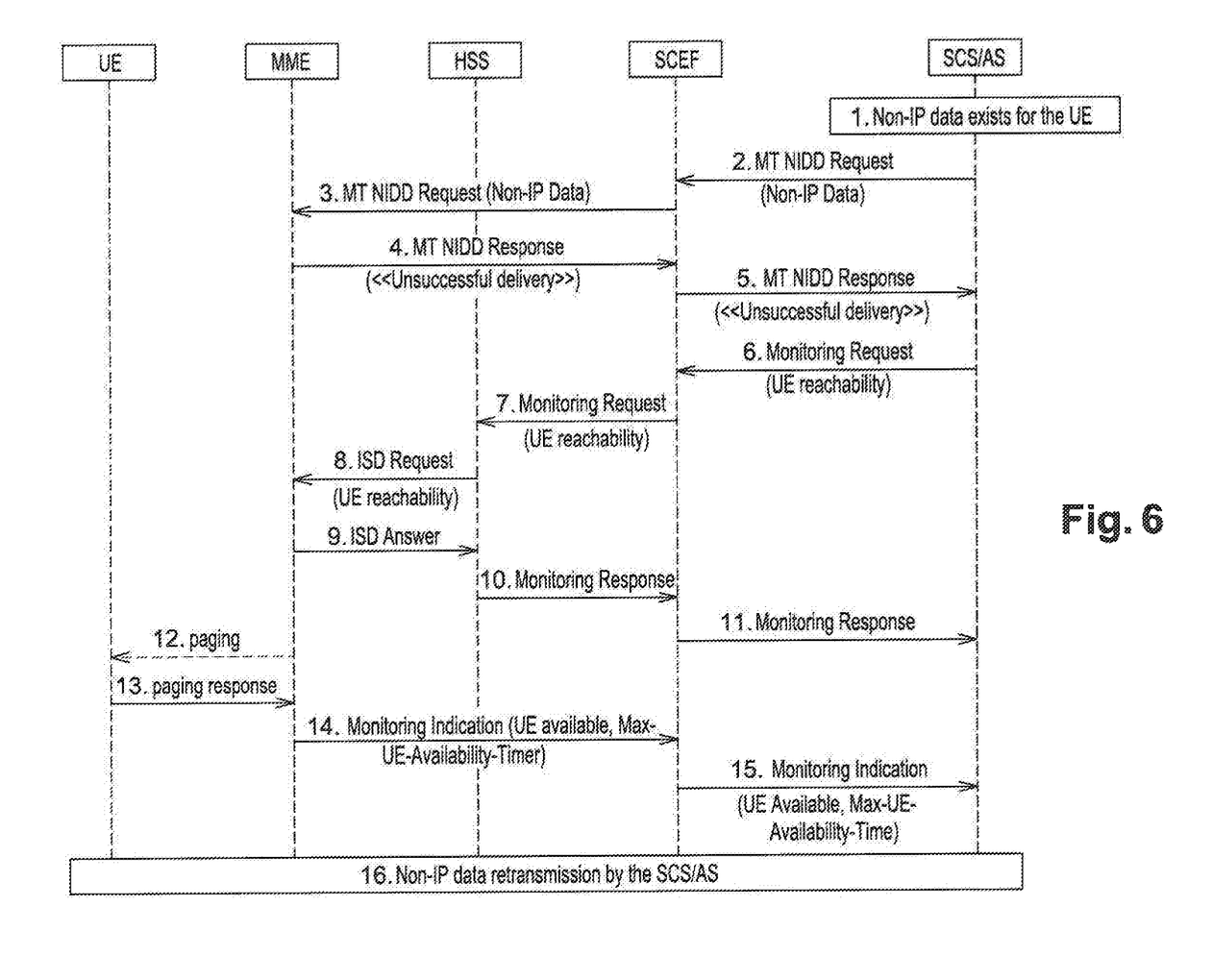
Figure 7:
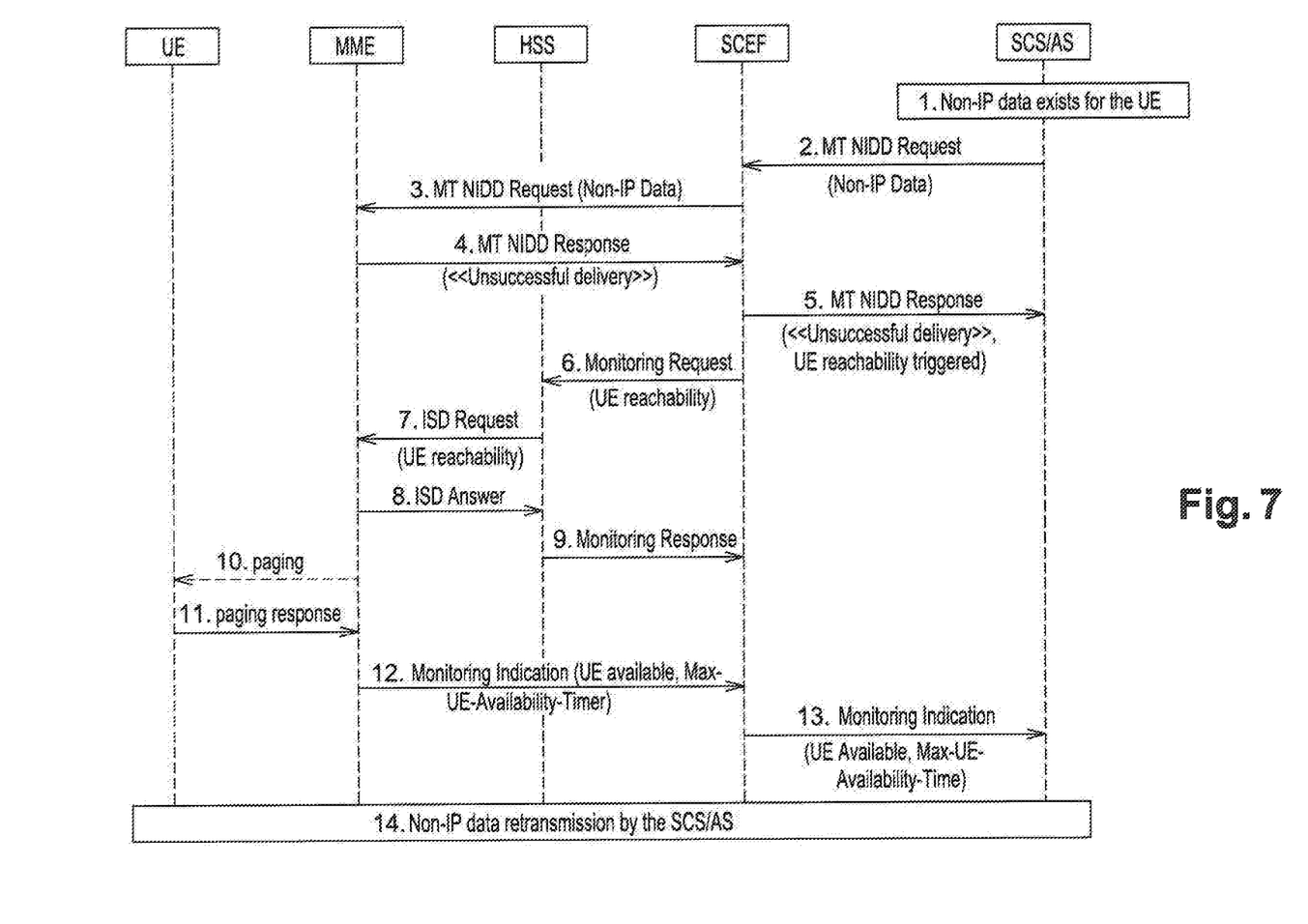
FIG. 7 illustrates an example of a MT NIDD procedure towards a UE using extended idle mode DRX, with retransmission triggered by a subsequent Notification due to a Monitoring Request sent by the SCEF.

FIG. 6 shows the scenario where the SCS/AS initiates the monitoring request. FIG. 7 shows the scenario where the SCEF initiates the monitoring request.

FIG. 6 illustrates an example of such MT NIDD procedure with retransmission triggered by a subsequent Notification—Monitoring Request sent by the SCS/AS.

FIG. 7 illustrates an example of such MT NIDD procedure with retransmission triggered by a subsequent Notification—Monitoring Request sent by the SCEF.

The example of MT NIDD procedure illustrated in FIG. 6 includes following steps:
1. The SCS/AS needs to send MT non-IP data for the UE.
2. The SCS/AS initiates the transfer of the non-IP data to the UE.
3. The SCEF sends the non-IP data towards the serving MME.
4. The MME rejects the request, i.e. sends towards the SCEF a MT NIDD Response including an indication of unsuccessful delivery.
5. The SCEF sends towards the SCS/AS a MT NIDD Response including an indication of unsuccessful delivery.
6 to 11. UE reachability monitoring procedure is initiated by the SCS/AS.
12. The MME pages the UE.
13. The UE responds to the paging request.
14. The MME notifies the SCEF that the UE is available, and includes in this notification the Maximum-UE-Availability-Time IE.
11. The SCEF notifies the SCS/AS that the UE is available, and includes in this notification the Maximum-UE-Availability-Time IE.
12. Retransmission of the non-IP data to the UE is performed, initiated by the SCS/AS, during the time period indicated by the Maximum-UE-Availability-Time information.

The example of MT NIDD procedure illustrated in FIG. 7 is similar to that illustrated in FIG. 6, taking into account that in FIG. 7 the SCEF initiates the UE reachability monitoring request. In this case, the MT NIDD Response sent by the SCEF to the SCS/AS in step 5 includes an indication that UE reachability monitoring has been triggered by the SCEF.

Note: A new additional parameter may be required in step 2 to enable or not the behaviour of the scenario of FIG. 7 (i.e. network triggered reporting of UE reachability).

Note: FIG. 7 would allow also the implementation option where the SCEF would store the Non-IP data for the duration until the UE becomes reachable. But this implementation option is not preferred.

Various aspects of the invention include (though not being limited to) following aspects.

One aspect of the invention is a mobile network entity such as Mobility Management Entity MME, configured for the support of Mobile-Terminated MT Data Delivery via an interface such as the T6a interface between a Service Capability Exposure Function SCEF and said mobile network entity, towards a User Equipment UE using extended idle mode DRX served by said mobile network entity.

Various embodiments may be provided, including (though not being limited to) following aspects and/or embodiments, which may be taken alone or in combination, according to various combinations.

In an embodiment, said mobile network entity is configured to:
receive from the SCEF a MT Data Delivery Request including information indicating a time frame within which a MT Data Delivery Response is awaited by the SCEF.

In an embodiment:
the MT data Delivery service corresponds to Non-IP Data Delivery MT NIDD.

In an embodiment, said mobile network entity is configured to:
if the UE is expected to respond within said time frame, store the MT Data, page the UE when the UE is known to be reachable and deliver the MT Data to the UE when the UE responds to the paging request.

Another aspect of the invention is a Service Capability Exposure Function SCEF, configured for the support of Mobile-Terminated MT Data Delivery via an interface such as the T6a interface between said Service Capability Exposure Function SCEF and a mobile network entity such as Mobility Management Entity MME, towards a User Equipment UE using extended idle mode DRX served by said mobile network entity.

Various embodiments may be provided, including (though not being limited to) following aspects and/or embodiments, which may be taken alone or in combination, according to various combinations.

In an embodiment, said SCEF is configured to:
send to said mobile network entity a MT Data Delivery Request including information indicating a time frame within which a MT Data Delivery Response is awaited by the SCEF.

In an embodiment:
the MT data Delivery service corresponds to Non-IP Data Delivery MT NIDD.

Another aspect of the invention is a mobile network entity such as Mobility Management Entity MME, configured for the support of Mobile-Terminated MT Data Delivery via an interface such as the T6a interface between a Service Capability Exposure Function SCEF and said mobile network entity, towards a User Equipment UE using extended idle mode DRX served by said mobile network entity.

Various embodiments may be provided, including (though not being limited to) following aspects and/or embodiments, which may be taken alone or in combination, according to various combinations.

In an embodiment, said mobile network entity is configured to:
receive from the SCEF a MT Data Delivery Request including information of a maximum retransmission time for retransmission of the MT Data.

In an embodiment:
the MT data Delivery service corresponds to Non-IP Data Delivery MT NIDD.

In an embodiment, said mobile network entity is configured to:
if the UE is expected to respond within said maximum retransmission time, send to the SCEF, in a MT Data Delivery Response indicating unsuccessful delivery to the UE, information indicating a retransmission time requested by the mobile network entity.

In an embodiment, said mobile network entity is configured to:
store information indicating that a MT NIDD Request is ongoing for the SCEF.

In an embodiment, said mobile network entity is configured to:
upon reception of Mobile-Originated signalling from the UE prior to said requested retransmission time, inform the SCEF that the UE is available for said MT Data delivery.

In an embodiment, said mobile network entity is configured to:
upon mobility of the UE to a new serving mobile network entity, inform the SCEF of said mobility to trigger the MT Data retransmission towards said new serving mobile network entity.

In an embodiment, said mobile network entity is configured to:
upon mobility of the UE to a new serving mobile network entity, inform said new serving mobile network entity that there is a pending MT Data Delivery towards this UE.

Another aspect of the invention is a Service Capability Exposure Function SCEF, configured for the support of MT Data Delivery via an interface such as T6a interface between said Service Capability Exposure Function SCEF and a mobile network entity such as Mobility Management Entity MME, towards a User Equipment UE using extended idle mode DRX served by said mobile network entity.

Various embodiments may be provided, including (though not being limited to) following aspects and/or embodiments, which may be taken alone or in combination, according to various combinations.

In an embodiment, said SCEF is configured to:
send to said mobile network entity a MT Data Delivery Request including information indicating a maximum retransmission time for retransmission of the MT Data.

In an embodiment:
the MT data Delivery service corresponds to Non-IP Data Delivery MT NIDD.

In an embodiment, said SCEF is configured to:
upon reception from said mobile network entity of a MT Data Delivery Response indicating unsuccessful delivery and containing information indicating a retransmission time requested by the mobile network entity, inform a source node such as Service Capability Server or Application Server SCS/AS, that said delivery is deferred.

In an embodiment, said SCEF is configured to:
upon reception from said mobile network entity of a MT Data Delivery Response indicating unsuccessful delivery and containing information indicating a retransmission time requested by the mobile network entity, retransmit the MT Data at the time requested by the mobile network entity or at the time the UE is notified to be available by said mobile network entity.

In an embodiment, said SCEF is configured to:
send to a source node such as Service Capability Server or Application Server, SCS/AS, a MT Data Delivery Response indicating unsuccessful delivery and containing information indicating a retransmission time requested by the mobile network entity.

Another aspect of the invention is a mobile network entity such as Mobility Management Entity MME, configured for the support of Mobile-Terminated Data Delivery via an interface such as T6a interface between a Service Capability Exposure Function SCEF and said mobile network entity, towards a User Equipment UE using extended idle mode DRX served by said mobile network entity.

Various embodiments may be provided, including (though not being limited to) following aspects and/or embodiments, which may be taken alone or in combination, according to various combinations.

In an embodiment, said mobile network entity is configured to:
once configured to monitor UE reachability after having rejected a MT Data Delivery Request from the SCEF, send to the SCEF, in a notification indicating that the UE is reachable again, information instructing to prioritize the retransmission of the MT Data towards this UE.

In an embodiment:
the MT data Delivery service corresponds to Non-IP Data Delivery MT NIDD.

In an embodiment, said mobile network entity is configured to:
send to the SCEF, in a notification indicating that the UE is reachable again, information referred to as maximum UE availability time, indicating a time period during which the mobile network entity intends to maintain a signalling connection with the UE.

Another aspect of the invention is a Service Capability Exposure Function SCEF, configured for the support of Mobile-Terminated Data Delivery via an interface such as T6a interface between said Service Capability Exposure Function SCEF and a mobile network entity such as Mobility Management Entity MME, towards a User Equipment UE using extended idle mode DRX served by said mobile network entity.

Various embodiments may be provided, including (though not being limited to) following aspects and/or embodiments, which may be taken alone or in combination, according to various combinations.

In an embodiment, said SCEF is configured to:
receive from the mobile network entity, in a notification indicating that the UE is reachable again after unsuccessful delivery, information instructing to prioritize the retransmission of the MT Data towards this UE In an embodiment:
the MT data Delivery service corresponds to Non-IP Data Delivery MT NIDD.

In an embodiment, said SCEF is configured to:
receive from the mobile network entity, in a notification indicating that the UE is reachable again after unsuccessful delivery, information referred to as maximum UE availability time indicating a time period during which the mobile network entity intends to maintain a signalling connection with the UE.

In an embodiment, said SCEF is configured to:
inform a source node such as Service Capability Server or Application Server SCS/AS of said information instructing to prioritize the retransmission of the MT Data towards this UE or said maximum UE availability time.

In an embodiment, said SCEF is configured to:
send to a source node such as Service Capability Server or Application Server SCS/AS a MT Data Delivery response indicating said unsuccessful delivery and containing an indication that UE reachability monitoring is triggered.

Another aspect of the invention is a mobile Core Network entity such as Mobility Management Entity MME, configured for the support of Mobile-Terminated SMS, or for the support of Mobile Terminating Data Delivery via an interface such as T6a interface between a Service Capability Exposure Function SCEF and said mobile Core Network entity, towards a User Equipment UE using extended idle mode DRX served by said mobile Core Network entity.

Various embodiments may be provided, including (though not being limited to) following aspects and/or embodiments, which may be taken alone or in combination, according to various combinations.

In an embodiment, said mobile Core Network entity is configured to:
send information to the Radio Access Network, to assist the Radio Access Network in determining a time during which a signalling connection with the UE should be maintained, based on a pending delivery of a Mobile-Terminated SMS or Mobile-Terminated Data to the UE.

In an embodiment:
the MT data Delivery service corresponds to Non-IP Data Delivery MT NIDD.

In an embodiment, said mobile Core Network entity is configured to:
set in S1AP signalling an Expected Activity Period value in the Expected UE Behaviour IE based on whether there is pending signalling to the UE, or to include a new information informing the eNodeB that there is pending network initiated signalling for that UE, or to include a recommended minimum user activity timer to be used by the eNodeB for that UE.

Another aspect of the invention is a method for support of Mobile Terminated delivery service towards a User Equipment UE using extended idle mode DRX, said method including at least one step performed by at least one of the thus configured entities.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus, comprising:
at least one processor; and
at least one memory including computer program code;
the at least one memory and the computer program code configured to, with the at least one processor, cause the apparatus at least to,
support mobile-terminated non-internet protocol data delivery via a T6a interface between a service capability exposure function and said apparatus, towards a user equipment using a power saving mechanism, served by said apparatus, and
receive from the service capability exposure function a mobile-terminated non-internet protocol data delivery request including information indicating a time frame within which a mobile-terminated non-internet protocol data delivery response is awaited by the service capability exposure function.

2. The apparatus according to claim 1, wherein the at least one memory and the computer program code are configured to, with the at least one processor, cause the apparatus at least to:
when the user equipment is expected to respond within said time frame, store mobile-terminated data, page the user equipment when the user equipment is known to be reachable, and deliver the mobile-terminated data to the user equipment when the user equipment responds to the paging request.

3. An apparatus comprising:
at least one processor; and
at least one memory including computer program code, the at least one memory and the computer program code configured to, with the at least one processor, cause the apparatus at least to,
support mobile-terminated non-internet protocol data delivery via a T6a interface between said apparatus and a mobile network entity, towards a user equipment using a power saving mechanism, served by said mobile network entity, and
send to said mobile network entity a mobile-terminated non-internet protocol data delivery request including information indicating a time frame within which a mobile-terminated non-internet protocol data delivery NIDD response is awaited by the apparatus.

4. An apparatus comprising:
at least one processor; and
at least one memory including computer program code, the at least one memory and the computer program code configured to, with the at least one processor, cause the apparatus at least to,
support mobile-terminated non-internet protocol data delivery via a T6a interface between a service capability exposure function and said apparatus, towards a user equipment using a power saving mechanism, served by said apparatus, and
receive, from the service capability exposure function, a mobile-terminated non-internet protocol data delivery request including information indicating a maximum retransmission time until which the service capability exposure function can retransmit mobile-terminated data.

5. The apparatus according to claim 4, wherein the at least one memory and the computer program code are configured to, with the at least one processor, cause the apparatus at least to:
when the user equipment is expected to respond within said maximum retransmission time, send to the service capability exposure function, in a mobile-terminated non-internet protocol data delivery response indicating unsuccessful delivery to the user equipment, information indicating a retransmission time requested by the apparatus.

6. The apparatus according to claim 5, wherein the at least one memory and the computer program code are configured to, with the at least one processor, cause the apparatus at least to:
store information indicating that a mobile-terminated non-internet protocol data delivery request is ongoing for the service capability exposure function.

7. The apparatus according to claim 5, wherein the at least one memory and the computer program code are configured to, with the at least one processor, cause the apparatus at least to:
upon availability of the user equipment prior to said requested retransmission time, inform the service capability exposure function that the user equipment is available for mobile-terminated data delivery.

8. The apparatus according to claim 5, wherein the at least one memory and the computer program code are configured to, with the at least one processor, cause the apparatus at least to:
upon mobility of the user equipment to a new serving mobile network entity, inform the service capability exposure function of said mobility to trigger mobile-terminated data retransmission towards said new serving mobile network entity.

9. The apparatus according to claim 5, wherein the at least one memory and the computer program code are configured to, with the at least one processor, cause the apparatus at least to:
upon mobility of the user equipment to a new serving mobile network entity, inform said new serving mobile network entity that there is a pending mobile-terminated non-internet protocol data delivery towards the user equipment.

10. An apparatus comprising:
at least one processor; and
at least one memory including computer program code,
the at least one memory and the computer program code configured to, with the at least one processor, cause the apparatus at least to,
support mobile-terminated non-internet protocol data delivery via a T6a interface between said apparatus and a mobile network entity towards a user equipment using a power saving mechanism, served by said mobile network entity, and
send to said mobile network entity a mobile-terminated non-internet protocol data delivery request including information indicating a maximum retransmission time until which the apparatus can retransmit mobile-terminated data.

11. The apparatus according to claim 10, wherein the at least one memory and the computer program code are configured to, with the at least one processor, cause the apparatus at least to:
receive, from said mobile network entity a mobile-terminated non-internet protocol data delivery response indicating unsuccessful delivery, and containing information indicating a retransmission time requested by the mobile network entity.

12. The apparatus according to claim 10, wherein the at least one memory and the computer program code are configured to, with the at least one processor, cause the apparatus at least to:
upon reception from said mobile network entity of a mobile-terminated non-internet protocol data delivery response indicating unsuccessful delivery and containing information indicating a retransmission time requested by the mobile network entity, inform a source node that said delivery is deferred.

13. The apparatus according to claim 10, wherein the at least one memory and the computer program code are configured to, with the at least one processor, cause the apparatus at least to:
upon reception from said mobile network entity of a mobile-terminated non-internet protocol data delivery response indicating unsuccessful delivery and containing information indicating a retransmission time requested by the mobile network entity, retransmit the mobile-terminated data at the time requested by the mobile network entity or at the time the user equipment is notified to be available by said mobile network entity.

14. The apparatus according to claim 10, wherein the at least one memory and the computer program code are configured to, with the at least one processor, cause the apparatus at least to:
send to a source node a mobile-terminated non-internet protocol data delivery response indicating unsuccessful delivery and containing information indicating a retransmission time requested by the mobile network entity.

15. An apparatus, comprising:
at least one processor; and
at least one memory including computer program code,
the at least one memory and the computer program code configured to, with the at least one processor, cause the apparatus at least to,
support mobile-terminated non-internet protocol data delivery via a T6a interface between a service capability exposure function and said apparatus, towards a user equipment using a power saving mechanism, served by said apparatus, and
once configured to monitor user equipment reachability after having rejected a mobile-terminated non-internet protocol data delivery request from the service capability exposure function, send to the service capability exposure function, in a notification indicating that the user equipment is reachable again, information indicating a maximum user equipment availability time indicating a time window during which the apparatus intends to maintain a signalling connection with the user equipment.

16. An apparatus comprising:
at least one processor; and
at least one memory including computer program code,
the at least one memory and the computer program code configured to, with the at least one processor, cause the apparatus at least to,
support mobile-terminated non-internet protocol data delivery via a T6a interface between said apparatus and a mobile network entity towards a user equipment using a power saving mechanism, served by said mobile network entity, and
receive from the mobile network entity, in a notification indicating that the user equipment is reachable again after unsuccessful delivery, information indicating a maximum user equipment availability time indicating a time window during which the mobile network entity intends to maintain a signalling connection with the user equipment.

17. The apparatus according to claim 16, wherein the at least one memory and the computer program code are configured to, with the at least one processor, cause the apparatus at least to:
use said information indicating a maximum user equipment availability time to prioritize retransmission of mobile-terminated data.

18. The apparatus according to claim 16, wherein the at least one memory and the computer program code are configured to, with the at least one processor, cause the apparatus at least to:
inform a source node of information instructing to prioritize retransmission of mobile-terminated data towards the user equipment or said maximum user equipment availability time.

19. The apparatus according to claim 16, wherein the at least one memory and the computer program code are configured to, with the at least one processor, cause the apparatus at least to:
send, to a source node, a mobile-terminated non-internet protocol data delivery response indicating said unsuccessful delivery and containing an indication that user equipment reachability monitoring is triggered.

* * * * *